3,184,501
HEXACHLOROBICYCLIC SULFONAMIDES
Sidney B. Richter, Chicago, Ill., assignor to Velsicol Chemical Corporation, Chicago, Ill., a corporation of Illinois
No Drawing. Filed Apr. 3, 1961, Ser. No. 100,004
6 Claims. (Cl. 260—470)

This invention relates to new sulfonamides and their manufacture. In particular this invention relates to hexachlorobicyclic sulfonamides.

The compounds of the present invention are represented by the following planar structural formula:

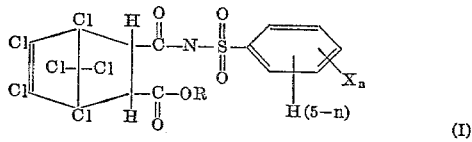

(I)

wherein X is selected from the group consisting of chlorine, bromine, amino, nitro, alkyl, alkylcarboxamido, alkoxy, and mixtures thereof; R is selected from the group consisting of alkyl and cycloalkyl; and $n$ is an integer from 0 to 5.

A substantial need exists for chemicals which possess activity towards the control of a plurality of agricultural pests.

Unexpectedly it has been found that the newly created compounds of the present invention possess remarkable activity in the control of fungi and weeds. This combination of herbicidal and fungicidal properties is of substantial importance, particularly in the preservation and cultivation of valuable plant life. In such instances the pesticide of the present invention would provide protection against plant disease and concomitantly provide protection from undesired plant growth. There are many other areas wherein such pesticidal activity is advantageous and of course the present compounds are useful for applications which require only herbicidal or fungicidal activity.

All of the compounds of the present invention surprisingly can be made by a single step reaction utilizing known reactants. This reaction is particularly unexpected since it involves the chain opening of the imide grouping of 1,4,5,6,7,7 - hexachlorobicyclo(2.2.1) - 5 - heptene - 2,3-dicarboximide, hereinafter referred to as chlorendic imide.

The present process comprises reacting chlorendic imide, an organic alcohol and an aryl sulfonyl chloride of the following structural formula:

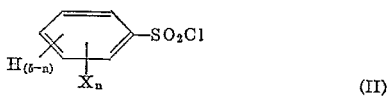

(II)

wherein R, X and $n$ are identical with the definitions of the like substituents contained in the presently claimed products as shown in structure I.

The organic alcohol used in the reaction must contain as its organic portion a radical selected from the group consisting of alkyl and cycloalkyl radicals in accordance with the definition of the R group of the present compounds, the organic group present in this reactant being identical with the R group of the final product.

Chlorendic imide, the third reactant, is readily prepared by the reacting chlorendic anhydride and ammonia. Its preparation is described in the literature and thus will not be detailed here.

Similarly the aryl sulfonyl chlorides of the above description are described in the literature. In choosing the specific aryl sulfonyl chloride for use in the present process, it is to be remembered that the substituents on the aromatic ring in this reactant will be the same as are present in the final product, said groups being designated X in structure I.

Since the present process involves the reaction of one mol of each of the three described reactants to produce the new products, the theoretical proportion of reactants is equimolar. A convenient procedure provides for the use of excess amounts of the alcohol as solvent. Naturally inert solvents can be used, although their use is not generally desirable since it requires an additional ingredient; however, in specific instances there can be advantage in such use. Thus considerable variation is permissive as to the concentration of reactants with excesses of respective reactants being useful depending upon the identity of the specific reactants. Large excesses of the organic alcohol for use as solvent is generally advantageous. Use of equimolar quantities of the sulfonyl chloride and chlorendic imide reactants is a reasonable one but other proportions can be used.

This process is performed at elevated temperatures, i.e., above about 20° C. A convenient procedure is to perform the reaction at the reflux temperature of the reaction mixture, a temperature which will vary with the identity of the reactants and which can be varied by changing the concentration of reactants and/or solvent, if any is used. Thus the optimum reaction temperature will vary somewhat from reaction to reaction, the reaction being carried out at elevated temperatures up to reflux.

Pressure is not critical. Although generally it is more convenient to perform the reaction under atmospheric pressure, pressures below and above atmospheric pressure are also operable.

The following examples illustrate this new process and the production of the present compounds.

EXAMPLE 1

Preparation of methyl 1,4,5,6,7,7-hexachloro-3-(toluene sulfonamidocarbonyl) - bicyclo(2.2.1) - 5-heptene - 2-carboxylate A solution of potassium hydroxide (5.8 grams; 0.104 mol) dissolved in methanol (75 ml.) was added to a refluxing solution of chlorendic imide (37.1 grams; 0.1 mol) dissolved in dioxane (75 ml.). This hot solution was then added to a cold solution of p-toluene sulfonyl chloride (19.1 grams; 0.1 mol) dissolved in dioxane (100 ml.) and allowed to reflux for 2 hours 15 minutes.

After being cooled to room temperature the solution was filtered and the solvent and excess reactants removed in vacuo. The product was recrystallized several times, first from heptane, then from each of isopropanol, benzene, hexane, benzene, and chloroform.

Elemental analysis showed the following—

Theoretical: C, 36.73; H, 2.34; Cl, 38.26. Found: C, 36.61; H, 2.53; Cl, 38.67.

EXAMPLE 2

Preparation of tetradecyl 1,4,5,6,7,7-hexachloro-3-(2'-chlorophenylsulfonamidocarbonyl) - bicyclo(2.2.1) - 5-heptene-2-carboxylate A solution of sodium (2.4 grams; 0.104 mol) dissolved in tetradecanol (100 ml.) is added to a solution of chlorendic imide (37.1 grams; 0.1 mol) dissolved in dioxane (75 ml.) This solution is then added to a cold solution of ortho-chlorobenzene sulfonyl chloride (21.1 grams; 0.1 mol) dissolved in dioxane (100 ml.) and allowed to reflux for 2 hours.

After being cooled to room temperature, the solution is filtered and the solvent and excess reactants removed in vacuo. The product is recrystallized from heptane and the desired product recovered therefrom.

EXAMPLE 3

*Preparation of undecyl 1,4,5,6,7,7-hexachloro-3-(3'-chlorobenzene sulfonamidocarbonyl)-bicyclo(2.2.1)-5-heptene-2-carboxylate*

A solution of sodium (2.4 grams; 0.104 mol) dissolved in undecanol (100 ml.) is added to a solution of chlorendic imide (37.1 grams; 0.1 mol) dissolved in dioxane (75 ml.). This solution is then added to a cold solution of meta-chlorobenzene sulfonyl chloride (21.1 grams; 0.1 mol) dissolved in dioxane (100 ml.) and allowed to reflux for 2 hours.

After being cooled to room temperature, the solution is filtered and the solvent and excess reactants removed in vacuo. The product is recrystallized from heptane and the desired product recovered therefrom.

EXAMPLE 4

*Preparation of tridecyl 1,4,5,6,7,7-hexachloro-3-(4'-chlorobenzene sulfonamidocarbonyl) - bicyclo(2.2.1) - 5-heptene-2-carboxylate*

A solution of sodium (2.4 grams; 0.104 mol) dissolved in tridecanol (100 ml.) is added to a refluxing solution of chlorendic imide (37.1 grams; 0.1 mol) dissolved in dioxane (75 ml.) This hot solution is then added to a cold solution of para-chlorobenzene sulfonyl chloride (21.1 grams; 0.1 mol) dissolved in dioxane (100 ml.) and allowed to reflux for 2 hours.

After being cooled to room temperature, the solution is filtered and the solvent and excess reactants removed in vacuo. The product is recrystallized from heptane and the desired product recovered therefrom.

EXAMPLE 5

*Preparation of cyclopentyl 1,4,5,6,7,7-hexachloro-3-(2',4'-dimethylbenzenesulfonamidocarbonyl) - bicyclo(2.2.1)-heptene-2-carboxylate*

A solution of potassium hydroxide (5.8 grams; 0.104 mol) dissolved in cyclopentanol (100 ml.) is added to a refluxing solution of chlorendic imide (37.1 grams; 0.1 mol) dissolved in dioxane (75 ml.) This hot solution is then added to a cold solution of 2,4-dimethylbenzene-sulfonylchloride (20.4 grams; 0.1 mol) dissolved in dioxane (100 ml.) and allowed to reflux for 2 hours.

After being cooled to room temeprature, the solution is filtered and the solvent and excess reactants removed in vacuo. The product is recrystallized from heptane and the desired product recovered therefrom.

EXAMPLE 6

*Preparation of cyclopentyl 1,4,5,6,7,7-hexachloro-3-(2',5'-dimethylbenzenesulfonamidocarbonyl) - bicyclo(2.2.1)-5-heptene-2-carboxylate*

A solution of potassium hydroxide (5.8 grams; 0.104 mol) dissolved in cyclopentanol (100 ml.) is added to a refluxing solution of chlorendic imide (37.1 grams; 0.1 mol) dissolved in dioxane (75 ml.). This hot solution is then added to a cold solution of 2,5-dimethylbenzene sulfonyl chloride (20.4 grams; 0.1 mol) dissolved in dioxane (100 ml.) and allowed to reflux for 2 hours.

After being cooled to room temperature, the solution is filtered and the solvent and excess reactants removed in vacuo. The product is recrystallized from heptane and the desired product recovered therefrom.

EXAMPLE 7

*Preparation of cyclohexyl 1,4,5,6,7,7-hexachloro-3-(2'-nitrobenzenesulfonamidocarbonyl) - bicyclo(2.2.1) - 5-heptene-2-carboxylate*

A solution of sodium (2.4 grams; 0.104 mol) dissolved in cyclohexanol (100 ml.) is added to a solution of chlorendic imide (37.1 grams; 0.1 mol) dissolved in dioxane (75 ml.). This solution is then added to a cold solution of ortho-nitrobenzenesulfonylchloride (22.1 grams; 0.1 mol) dissolved in dioxane (100 ml.) contained in a glass reaction flask equipped with reflux condenser allowed to reflux for 2 hours.

After being cooled to room temperature, the solution is filtered and the solvent and excess reactants removed in vacuo. The product is recrystallized from heptane and the desired product recovered therefrom.

EXAMPLE 8

*Preparation of cyclohexyl 1,4,5,6,7,7-hexachloro-3-(3' nitrobenzenesulfonamidocarbonyl) - bicyclo(2.2.1) - 5-heptene-2-carboxylate*

A solution of sodium (2.4 grams; 0.104 mol) dissolved in cyclohexanol (100 ml.) is added to a solution of chlorendic imide (37.1 grams; 0.1 mol) dissolved in dioxane (75 ml.). This solution is then added to a cold solution of meta-nitrobenzene sulfonyl chloride (22.1 grams; 0.1 mol) dissolved in dioxane (100 ml.) contained in a glass reaction flask equipped with reflux condenser allowed to reflux for 2 hours.

After being cooled to room temperature, the solution is filtered and the solvent and excess reactants removed in vacuo. The product is recrystallized from heptane and the desired product recovered therefrom.

EXAMPLE 9

*Preparation of cyclohexyl 1,4,5,6,7,7-hexachloro-3-(4'-nitrobenzenesulfonamidocarbonyl) - bicyclo(2.2.1) - 5-heptene-2-carboxylate*

A solution of sodium (2.4 grams; 0.104 mol) dissolved in cyclohexanol (100 ml.) is added to a solution of chlorendic imide (37.1 grams; 0.1 mol) dissolved in dioxane (75 ml.). This solution is then added to a cold solution of para-nitrobenzenesulfonylchloride (22.1 grams; 0.1 mol) dissolved in dioxane (100 ml.) and allowed to reflux for 2 hours.

After being cooled to room temperature, the solution is filtered and the solvent and excess reactants removed in vacuo. The product is recrystallized from heptane and the desired product recovered therefrom.

EXAMPLE 10

*Preparation of ethyl 1,4,5,6,7,7 - hexachloro - 3-(2'-bromobenzenesulfonamidocarbonyl) - bicyclo - (2.2.1)-5-heptene-2-carboxylate*

A solution of potassium hydroxide (5.8 grams; 0.104 mol) dissolved in ethanol (100 ml.) is added to a refluxing solution of chlorendic imide (37.1 grams; 0.1 mol) dissolved in dioxane (75 ml.). This hot solution is then added to a cold solution of ortho-bromobenzenesulfonyl chloride (25.5 grams; 0.1 mol) dissolved in dioxane (100 ml.) and allowed to reflux for 2 hours.

After being cooled to room temperature, the solution is filtered and the solvent and excess reactants removed in vacuo. The product is recrystallized from heptane and the desired product recovered therefrom.

EXAMPLE 11

*Preparation of ethyl 1,4,5,6,7,7 - hexachloro - 3 - (3' - bromobenzenesulfonamidocarbonyl) - bicyclo - (2.2.1)-5-heptene-2-carboxylate*

A solution of potassium hydroxide (5.8 grams; 0.104 mol) dissolved in ethanol (100 ml.) is added to a refluxing solution of chlorendic imide (37.1 grams; 0.1 mol) dissolved in dioxane (75 ml.). This hot solution is then added to a cold solution of meta-bromobenzene sulfonyl chloride (25.5 grams; 0.1 mol) dissolved in dioxane (100 ml.) and allowed to reflux for 2 hours.

After being cooled to room temperature, the solution is filtered and the solvent and excess reactants removed in vacuo. The product is recrystallized from heptane and the desired product recovered therefrom.

EXAMPLE 12

*Preparation of ethyl 1,4,5,6,7,7 - hexachloro - 3 - (4' - bromobenzenesulfonamidocarbonyl) - bicyclo - (2.2.1)-5-heptene-2-carboxylate*

A solution of potassium hydroxide (5.8 grams; 0.104 mol) dissolved in ethanol (100 ml.) is added to a refluxing solution of chlorendic amide (37.1 grams; 0.1 mol) dissolved in dioxane (75 ml). This hot solution is then added to a cold solution of para-bromobenzene sulfonyl chloride (25.5 grams; 0.1 mol) dissolved in dioxane (100 ml.) and allowed to reflux for 2 hours.

After being cooled to room temperature, the solution is filtered and the solvent and excess reactants removed in vacuo. The product is recrystallized from heptane and the desired product recovered therefrom.

EXAMPLE 13

*Preparation of propyl 1,4,5,6,7,7 - hexachloro - 3 - (2',3' - dimethylbenzenesulfonamidocarbonyl)-bicyclo-(2.2.1)-5-heptene-2-carboxylate*

A solution of potassium hydroxide (5.8 grams; 0.104 mol) dissolved in propanol (100 ml.) is added to a refluxing solution of chlorendic imide (37.1 grams; 0.1 mol) dissolved in dioxane (75 ml.). This hot solution is then added to a cold solution of ortho-xylenesulfonyl chloride (20.4 grams; 0.1 mol) dissolved in dioxane (100 ml.) and allowed to reflux for 2 hours.

After being cooled to room temperature, the solution is filtered and the solvent and excess reactants removed in vacuo. The product is recrystallized from heptane and desired product recovered therefrom.

EXAMPLE 14

*Preparation of propyl 1,4,5,6,7,7 - hexachloro - 3 - (2',4' - dimethylbenzenesulfonamidocarbonyl)-bicyclo-(2.2.1)-5-heptene-2-carboxylate*

A solution of potassium hydroxide (5.8 grams; 0.104 mol) dissolved in propanol (100 ml.) is added to a refluxing solution of chlorendic imide (37.1 grams; 0.1 mol) dissolved in dioxane (75 ml.). This hot solution is then added to a cold solution of meta-xylene sulfonyl chloride (20.4 grams; 0.1 mol) dissolved in dioxane (100 ml.) and allowed to reflux for 2 hours.

After being cooled to room temperature, the solution is filtered and the solvent and excess reactants removed in vacuo. The product is recrystallized from heptane and the desired product recovered therefrom.

EXAMPLE 15

*Preparation of propyl 1,4,5,6,7,7 - hexachloro - 3 - (2',5' - dimethylbenzenesulfonamidocarbonyl)-bicyclo-(2.2.1)-5-heptene-2-carboxylate*

A solution of potassium hydroxide (5.8 grams; 0.104 mol) dissolved in propanol (100 ml.) is added to a refluxing solution of chlorendic imide (37.1 grams; 0.1 mol) dissolved in dioxane (75 ml.). This hot solution is then added to a cold solution of para-xylenesulfonyl chloride (20.4 grams; 0.1 mol) dissolved in dioxane (100 ml.) and allowed to reflux for 2 hours.

After being cooled to room temperature, the solution is filtered and the solvent and excess reactants removed in vacuo. The product is recrystallized from heptane and the desired product recovered therefrom.

EXAMPLE 16

*Preparation of pentyl 1,4,5,6,7,7-hexachloro-3-(2'-acetamidobenzenesulfonamidocarbonyl) - bicyclo(2.2.1) - 5-heptene-2-carboxylate*

A solution of sodium (2.4 grams; 0.104 mol) dissolved in pentanol (100 ml.) is added to a solution of chlorendic imide (37.1 grams; 0.1 mol) dissolved in dioxane (75 ml.). This solution is then added to a cold solution of ortho-acetamidosulfonylchloride (23.4 grams; 0.1 mol) dissolved in dioxane (100 ml.) and allowed to reflux for 2 hours.

After being cooled to room temperature, the solution is filtered and the solvent and excess reactants removed in vacuo. The product is recrystallized from heptane and the desired product recovered therefrom.

EXAMPLE 17

*Preparation of pentyl 1, 4,5,6,7,7-hexachloro-3-(3'-acetamidobenzenesulfonamidocarbonyl) - bicyclo(2.2.1) - 5-heptene-2-carboxylate*

A solution of potassium hydroxide (5.8 grams; 0.104 mol) dissolved in pentanol (100 ml.) is added to a refluxing solution of chlorendic imide (37.1 grams; 0.1 mol) dissolved in dioxane (75 ml.). This hot solution is then added to a cold solution of meta-acetamidosulfonylchloride (23.4 grams; 0.1 mol) dissolved in dioxane (100 ml.) and allowed to reflux for 2 hours.

After being cooled to room temperature, the solution is filtered and the solvent and excess reactants removed in vacuo. The product is recrystallized from heptane and the desired product recovered therefrom.

EXAMPLE 18

*Preparation of pentyl 1,4,5,6,7,7-hexachloro-3-(4'-propionamidobenzenesulfonamidocarbonyl) - bicyclo(2.2.1)-5-heptene-2-carboxylate*

A solution of potassium hydroxide (5.8 grams; 0.104 mol) dissolved in pentanol (100 ml.) is added to a refluxing solution of chlorendic imide (37.1 grams; 0.1 mol) dissolved in dioxane (75 ml.). This hot solution is then added to a cold solution of para-propionamidosulfonylchloride (24.8 grams; 0.1 mol) dissolved in dioxane (100 ml.) and allowed to reflux for 2 hours.

After being cooled to room temperature, the solution is filtered and the solvent and excess reactants removed in vacuo. The product is recrystallized from heptane and the desired product recovered therefrom.

EXAMPLE 19

*Preparation of heptyl 1,4,5,6,7,7-hexachloro-3-(2'-ethyl-3'-butyramidobenzenesulfonamidocarbonyl) - 5 - heptene-2-carboxylate*

A solution of potassium hydroxide (5.8 grams; 0.104 mol) dissolved in heptanol (100 ml.) is added to a refluxing solution of chlorendic imide (37.1 grams; 0.1 mol) dissolved in dioxane (75 ml.). This hot solution is then added to a cold solution of 2-ethyl-3-butyramidobenzenesulfonylchloride (29.0 grams; 0.1 mol) dissolved in dioxane (100 ml.) and allowed to reflux for 2 hours.

After being cooled to room temperature, the solution is filtered and the solvent and excess reactants removed in vacuo. The product is recrystallized from heptane and the desired product recovered therefrom.

EXAMPLE 20

*Preparation of hexyl 1,4,5,6,7,7-hexachloro-3-(2'-methoxybenzenesulfonamidocarbonyl)-5-heptene - 2 - carboxylate*

A solution of sodium (2.4 grams; 0.104 mol) dissolved in heptanol (100 ml.) is added to a solution of chlorendic imide (37.1 grams; 0.1 mol) dissolved in dioxane (75 ml.). This solution is then added to a cold solution of 2-methoxybenzenesulfonylchloride (20.6 grams; 0.1 mol) dissolved in dioxane (100 ml.) and allowed to reflux for 2 hours.

After being cooled to room temperature, the solution is filtered and the solvent and excess reactants removed in vacuo. The product is recrystallized from heptane and the desired product recovered therefrom.

EXAMPLE 21

*Preparation of octyl 1,4,5,6,7,7-hexachloro-3-(3'-butoxy benzenesulfonamidocarbonyl)-5-heptene - 2 - carboxylate*

A solution of sodium (2.4 grams; 0.104 mol) dissolved in octanol (100 ml.) is added to a solution of chlorendic imide (37.1 grams; 0.1 mol) dissolved in dioxane (75 ml.). This solution is then added to a cold solution of 3-butoxybenzenesulfonylchloride (24.8 grams; 0.1 mol) dissolved in dioxane (100 ml.) and allowed to reflux for 2 hours.

After being cooled to room temperature, the solution is filtered and the solvent and excess reactants removed in vacuo. The product is recrystallized from heptane and the desired product recovered therefrom.

EXAMPLE 22

*Preparation of nonyl 1,4,5,6,7,7-hexachloro-3-(4'-decyloxybenzenesulfonamidocarbonyl)-5 - heptene - 2 - carboxylate*

A solution of sodium (2.4 grams; 0.104 mol) dissolved in nonanol (100 ml.) is added to a solution of chlorendic imide (37.1 grams; 0.1 mol) dissolved in dioxane (75 ml.). This solution is then added to a cold solution of 4-decyloxybenzenesulfonylchloride (33.2 grams; 0.1 mol) dissolved in dioxane (100 ml.) and allowed to reflux for 2 hours.

After being cooled to room temperature, the solution is filtered and the solvent and excess reactants removed in vacuo. The product is recrystallized from heptane and the desired product recovered therefrom.

EXAMPLE 23

*Preparation of ethyl-1,4,5,6,7,7-hexachloro-3-benzenesulfonamidocarbonyl-5-heptene-2-carboxylate*

A solution of potassium hydroxide (5.8 grams; 0.104 mol) dissolved in ethanol (100 ml.) is added to a refluxing solution of chlorendic imide (37.1 grams; 0.1 mol) dissolved in dioxane (75 ml.). This hot solution is then added to a cold solution of benzenesulfonylchloride (17.6 grams; 0.1 mol) dissolved in dioxane (100 ml.) and allowed to reflux for 2 hours.

After being cooled to room temperature, the solution is filtered and the solvent and excess reactants removed in vacuo. The product is recrystallized from heptane and the desired product recovered therefrom.

The above examples thoroughly illustrate the present compounds and a method for their production. It is evident that various combinations of the R and X substituents using the nomenclature of structure I can be prepared in accordance with the present invention. Not only can various combinations of the R groups be present in the various isomeric configurations but also each such configuration can be present when R is any of the selected radicals.

As previously indicated the present compounds have utility as herbicides and as fungicides. Thus not only do they have utility for applications where there is required a herbicide or a fungicide but additionally they offer the unique quality of servicing areas wherein both weeds and fungi are a problem.

In order to ascertain the fungicidal activity of the present compounds, pinto bean seedlings grown under greenhouse conditions were mounted on a turntable and sprayed with methyl-1,4,5,6,7,7-hexachloro-3-(toluenesulfonamidocarbonyl)-5-heptene-2-carboxylate at the specified concentrations for 30 seconds at 30 pounds pressure. Plants were allowed to dry, inoculated with spore suspensions of the bean rust organism, *Uromyces phaseoli* and placed in an incubation chamber for 24 to 48 hours. Plants were then removed, maintained under greenhouse conditions for 10 to 14 days, and the number of rust pustules on the leaves of each plant then determined. Three replicates were used for each test increment. At a concentration of 1,000 parts per million the average percent control of three replicas was 93 and at a concentration as low as 100 parts per million it was 82.

Then in order to determine the systemic fungus control of the present compounds, pinto bean seedlings were placed in aqueous solutions of methyl-1,4,5,6,7,7-hexachloro-3-(toluene sulfonamidocarbonyl)-5 - heptene-2-carboxylate at specified concentrations. After 96 hours of exposure to the test compound, plants were inoculated with the bean rust (*Uromyces phaseoli*) organism, held in an inoculation chamber for 24 hours, and then removed to greenhouse conditions. Effectiveness was determined by the number of rust pustules present 7 to 10 days following inoculation. At the low concentration of 100 parts per million, this compound rendered 80 percent control of the bean rust.

Then in order to determine the presence of herbicidal activity in the present compounds, methyl-1,4,5,6,7,7-hexachloro - 3 - (toluenesulfonamidocarbonyl)-5-heptene-2-carboxylate was formulated into a 10 percent wettable powder and dispersed in water to a concentration of 2,000 parts per million. Ten milliliters of an aliquot portion of the dispersion was applied to the soil surface of young potted tomato plants. Three plants were used for the application. Treated plants were held under greenhouse conditions for 7 days, provided with subterranean watering and observed for response to the treatment. After 7 days the tomato plants were dead.

In applying the present compounds standard formulation and application techniques can be used to prepare the formulated pesticidal compositions.

These formulated pesticidal compositions are prepared by mixing one or more of the new compounds of this invention with inert carriers to provide formulations adapted for ready and efficient application with conventional applicator equipment to the site of the pest infestation. For example, pesticidal compositions or formulations according to this invention are prepared in the form of solids or liquids. Solid compositions are preferably in the form of dusts. These are prepared to give homogeneous, free-flowing dusts by admixing the active compound or compounds of this invention with finely divided solids such as the talcs, natural clays, pyrophyllite, diatomaceous earth, fuller's earth, or flours such as walnut shell, wheat, redwood, soya bean, or cottonseed flours. Other inert solid carriers of the type ordinarily used in preparing pest control compositions in dusts or powdered form can also be used.

Liquid compositions according to this invention are prepared by admixing one or more of the new compounds of this invention with a suitable insert liquid diluent. In some cases the compounds are sufficiently soluble in the common pesticide solvents such as kerosene, xylene, fuel oil, the alkylated naphthalenes, and the like so that they can be used directly as solution in these substances. However, the pesticidal compositions of this invention can also contain a surface-active agent of the kind used in the art to enable the active compounds to be readily dispersed in water or other liquids to give sprays, which are a preferred method of applying the active compounds of this invention. The surface-active agents can be of the anionic, cationic or nonionic types. Typical examples of such surface-active agents are sodium stearate, potassium laurate, morpholine oleate, sodium lauryl sulfate, amine hydrochlorides such as laurylamine hydrochloride, alkylated aryl polyether alcohols such as the condensation product of diamylphenol with ethylene oxide, and the like. Mixtures of such agents can be used to combine or modify properties. The proportion of these agents will ordinarily vary from about 1% or less to about 15% by weight of the pesticidal compositions. Other pesticides as well as such substances as fertilizers, activators, adhesives, spreaders, and synergists can be added to these formulations if desired. The manner in which typical pesticidal compositions according to this invention can be prepared is illustrated in the following examples. All quantities given are in parts by weight.

EXAMPLE 24

*Preparation of an emulsifiable concentrate*

The following ingredients are blended thoroughly until a homogeneous liquid concentrate is obtained. This concentrate is mixed with water to give an aqueous dispersion containing the desired concentration of active compound for use as a spray.

| | |
|---|---:|
| Methyl-1,4,5,6,7,7-hexachloro-3-(toluenesulfonamidocarbonyl)-bicyclo(2.2.1)-5-heptene-2-carboxylate | 25 |
| Sodium lauryl sulfate | 2 |
| Sodium lignin sulfonate | 3 |
| Kerosene | 70 |

EXAMPLE 25

*Preparation of a wettable powder*

The following components are mixed intimately in conventional mixing or blending equipment and are then gound to a powder having an average particle size of less than about 50 microns. The finished powder is dispersed in water to give the desired concentration of active compound.

| | |
|---|---:|
| Ethyl-1,4,5,6,7,7-hexachloro-3-(toluene-sulfonamidocarbonyl)-bicyclo(2.2.1)-5-heptene-2-carboxylate | 75 |
| Fuller's earth | 23 |
| Sodium lauryl sulfate | 2 |

EXAMPLE 26

*Preparation of an oil-dispersible powder*

The following components are blended and ground as described in the previous example to give a powder which can be dispersed in oil to form a spray outlining the desired concentration of active compound.

| | |
|---|---:|
| Propyl-1,4,5,6,7,7-hexachloro-3-(toluene-sulfoamidocarbonyl)-bicyclo(2.2.1)-5-heptene-2-carboxylate | 70 |
| Condensation product of diamylphenol with ethylene oxide | 4 |
| Fuller's earth | 26 |

EXAMPLE 27

*Preparation of a dust*

The following ingredients are mixed thoroughly and then ground to an average particle size of less than about 50 microns to give a dust suitable for application with conventional dusting equipment.

| | |
|---|---:|
| Methyl-1,4,5,6,7,7-hexachloro-3-(benzene-sulfoamidocarbonyl)-bicyclo(2.2.1)-5-heptene-2-carboxylate | 20 |
| Talc | 80 |

EXAMPLE 28

*Preparation of a granular formulation*

The following ingredients are mixed with sufficient water to form a paste, which is then extruded, dried, and ground to give granules, preferably from about 1/32 to 1/4 inch in diameter. The granules are applied with fertilizer spreader equipment or other conventional apparatus. The dextrin in this formulation serves as a binding agent.

| | |
|---|---:|
| Ethyl-1,4,5,6,7,7-hexachloro-3-(benzene-sulfonamidocarbonyl)-bicyclo(2.2.1)-5-heptene-2-carboxylate | 10 |
| Fuller's earth | 66 |
| Dextrin | 20 |
| Sodium lignin sulfonate | 3 |
| Kerosene | 1 |

I claim:
1.

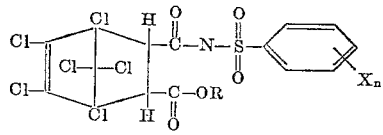

wherein X is selected from the group consisting of hydrogen, chlorine, bromine, nitro, lower alkyl, lower alkoxy and lower carboxamido; R is selected from the group consisting of alkyl containing from 1–14 carbon atoms, cyclopentyl and cyclohexyl; and $n$ is an integer from 0 to 2.

2. Methyl-1,4,5,6,7,7-hexachloro-3-(toluene-sulfonamidocarbonyl)-bicyclo(2.2.1)-5-heptene-2-carboxylate.
3. Ethyl-1,4,5,6,7,7-hexachloro-3-(toluene-sulfonamidocarbonyl)-bicyclo(2.2.1)-5-heptene-2-carboxylate.
4. Propyl-1,4,5,6,7,7-hexachloro-3-(toluene-sulfonamidocarbonyl)-bicyclo(2.2.1)-5-heptene-2-carboxylate.
5. Methyl-1,4,5,6,7,7-hexachloro-3-(benzene-sulfonamidocarbonyl)-bicyclo(2.2.1)-5-heptene-2-carboxylate.
6. Ethyl-1,4,5,6,7,7-hexachloro-3-(benzene-sulfonamidocarbonyl)-bicyclo(2.2.1)-5-heptene-2-carboxylate.

References Cited by the Examiner

UNITED STATES PATENTS

| | | | |
|---|---|---|---|
| 2,321,468 | 6/43 | Donleavy | 260—470 |
| 2,588,997 | 3/52 | Towne et al. | 167—30 |
| 2,744,129 | 5/56 | Caldwell | 260—470 |
| 2,758,918 | 8/56 | Soloway | 260—468 |
| 2,784,072 | 3/57 | Garman et al. | 71—2.6 |
| 2,795,589 | 6/57 | Bluestone | 260—326 |

LORRAINE A. WEINBERGER, *Acting Primary Examiner.*

DUVAL McCLUTCHEN, LEON ZITVER, *Examiners.*